US008417594B2

(12) United States Patent
Schlueter et al.

(10) Patent No.: US 8,417,594 B2
(45) Date of Patent: Apr. 9, 2013

(54) DIMENSION-BASED FINANCIAL REPORTING USING MULTIPLE COMBINATIONS OF DIMENSIONS

(75) Inventors: Geoffrey Richard Schlueter, Littleton, CO (US); Michael Ricke Evans, Castle Rock, CO (US); Michael Allen Bush, Highlands Ranch, CO (US); Amy Lynn Ford, Elizabeth, CO (US)

(73) Assignee: Microsoft Corporation, Redmond, WA (US)

( * ) Notice: Subject to any disclaimer, the term of this patent is extended or adjusted under 35 U.S.C. 154(b) by 515 days.

(21) Appl. No.: 12/144,608

(22) Filed: Jun. 23, 2008

(65) Prior Publication Data

US 2009/0319403 A1    Dec. 24, 2009

(51) Int. Cl.
*G07B 17/00* (2006.01)
*G06F 7/10* (2006.01)
(52) U.S. Cl. .............................................. 705/30; 707/2
(58) Field of Classification Search ...................... 705/30
See application file for complete search history.

(56) References Cited

U.S. PATENT DOCUMENTS

| | | | |
|---|---|---|---|
| 6,581,068 B1 * | 6/2003 | Bensoussan et al. | 1/1 |
| 7,143,107 B1 | 11/2006 | Nebres, Jr. | |
| 7,302,444 B1 | 11/2007 | Dunmore et al. | |
| 8,073,777 B2 * | 12/2011 | Barry et al. | 705/50 |
| 2005/0216378 A1 | 9/2005 | Bickel et al. | |
| 2005/0222945 A1 | 10/2005 | Pannicke et al. | |
| 2006/0190397 A1 | 8/2006 | Lindemann et al. | |
| 2006/0230025 A1 | 10/2006 | Baelen | |
| 2007/0130032 A1 | 6/2007 | Nelson et al. | |
| 2007/0136155 A1 | 6/2007 | Chape et al. | |
| 2007/0136352 A1 | 6/2007 | Chape et al. | |
| 2007/0239508 A1 * | 10/2007 | Fazal et al. | 705/8 |
| 2009/0018996 A1 * | 1/2009 | Hunt et al. | 707/2 |

OTHER PUBLICATIONS

"MBS, FRX Financial Reporting Extender", Jan. 7, 2008.*
"FRX Financial Reporting Extender", 1999-2005, Accountings Software Advisor, pp. 5.
"Microsoft FRx", Microsoft Corporation, 2007, pp. 2.
"Integrating Oracle Financial Analyzer Release 6.2 with Oracle General Ledger Release 11", Release 1.0, Oracle Corporation, 1998, p. 138.
"Adonix X3—General Ledger", 1996-2008, 2020software.com and TechTarget, pp. 2.
"FRX Financial Reporting Extender", downloaded Jan. 7, 2008 from http://www.mbadvisor.com/frx/frx.htm, Accountings Software Advisor, 5 pages.
"Adonix X3—General Ledger", downloaded Jan. 7, 2008 from http://www.2020software.com/broducts/Adonix_X3_General_Ledger.asp, 2020software.com and TechTarget, 2 pages.

* cited by examiner

*Primary Examiner* — Garcia Ade
(74) *Attorney, Agent, or Firm* — Hope Baldauff Hartman, LLC (57) ABSTRACT

Tools and techniques are described for dimension-based financial reporting using multiple combinations of dimensions. These tools may provide methods that include receiving requests, submitted on behalf of users of dimension-based financial reporting systems. These methods may create reports from the financial reporting systems. In some cases, these requests from the users may reference incomplete account structures, and may also specify customized hierarchies for the reports. In such cases, the methods may determine that these requests reference incomplete account structures, and may transform the incomplete account structures to create fully-qualified requests. In addition, these methods may include identifying dimensions, as maintained by the financial reporting systems, that are responsive to the requests, and may combine these dimensions into responses to the requests.

6 Claims, 7 Drawing Sheets

DIMENSION-BASED FINANCIAL REPORTING USING MULTIPLE COMBINATIONS OF DIMENSIONS

BACKGROUND

Enterprise resource planning (ERP) systems enable various types of reporting across a variety of different enterprise systems. In some cases, ERP systems may be used to report financial information within the enterprise. However, in some cases, this financial information may be incomplete or not fully organized, thereby complicating the process of searching this financial information, and extracting relevant reports therefrom.

SUMMARY

Tools and techniques are described for dimension-based financial reporting using multiple combinations of dimensions. These tools may provide methods that include receiving requests, submitted on behalf of users of dimension-based financial reporting systems. These methods may create reports from the financial reporting systems. In some cases, these requests from the users may reference incomplete account structures, and may also specify customized hierarchies for the reports. In such cases, the methods may determine that these requests reference incomplete account structures, and may transform the incomplete account structures to create fully-qualified requests. In addition, these methods may include identifying dimensions, as maintained by the financial reporting systems, that are responsive to the requests, and may combine these dimensions into responses to the requests.

The above-described subject matter may also be implemented as a method, computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for dimension-based financial reporting using multiple dimensions. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of tools and techniques for dimension-based financial reporting using multiple dimensions will be described.

Figure 1:
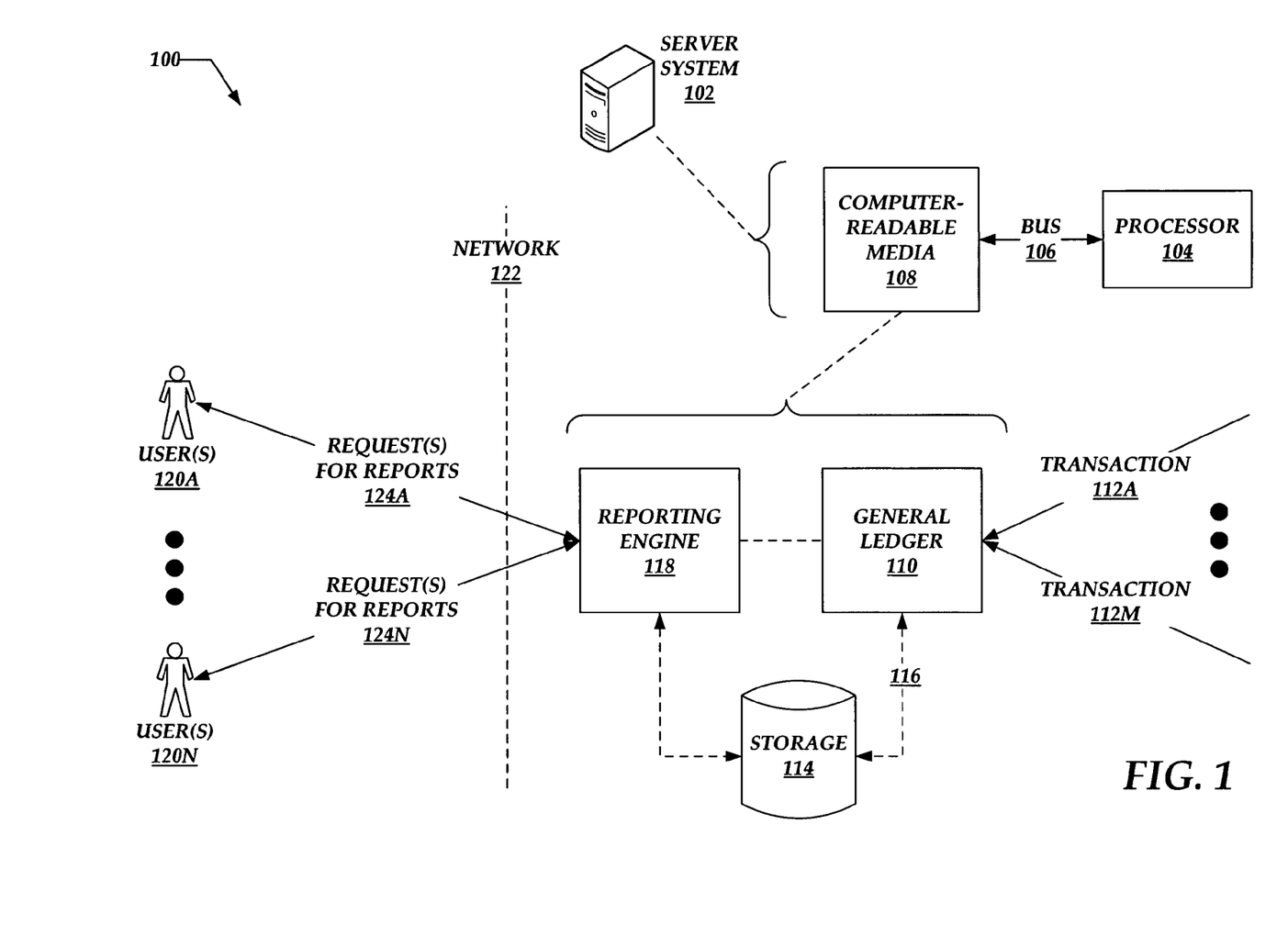
FIG. 1 is a combined block and flow diagram illustrating systems or operating environments for dimension-based financial reporting using multiple dimensions.

FIG. 1 illustrates systems or operating environments, denoted generally at 100, for dimension-based financial reporting using multiple dimensions. These systems 100 may include one or more server systems 102, with FIG. 1 illustrating one server system for clarity only. However, implementations of the description herein may include any number of server systems.

Turning to the server systems 102 in more detail, these may include one or more processors 104, which may have a particular type or architecture, chosen as appropriate for particular implementations. The processors 104 may couple to one or more bus systems 106 chosen for compatibility with the processors 104.

The server systems 102 may also include one or more instances of computer-readable storage media 108, which couple to the bus systems 106. The bus systems may enable the processors 104 to read code and/or data to and/or from the computer-readable storage media 108. The media 108 may represent storage elements implemented using any suitable technology, including but not limited to semiconductors, magnetic materials, optics, or the like. The media 108 may include memory components, whether classified as RAM, ROM, flash, or other types, and may also represent hard disk drives.

The storage media 108 may include one or more data structures and modules of instructions that, when loaded into the processor 104 and executed, cause the server systems 102 to perform various techniques for dimension-based financial reporting using multiple dimensions. Examples of these modules may include a general ledger module 110. In general, the general ledger 110 is operative to receive indications of a plurality of financial transactions, examples of which are shown at 112a and 112m (collectively, transactions 112).

These transactions 112 may occur locally on the server system 102, or may occur on other computing systems and be reported to the server system 102. In turn, the general ledger may extract information relating to these transactions 112, and store this information in one or more storage elements 114, as represented at 116. The storage elements 114 may take the form of one or more mass-storage devices and related administrative software, examples of which may include database management systems, chosen as appropriate in different implementation environments.

For convenience of illustration and description, but not to limit possible implementations, FIG. 1 illustrates a reporting engine 118 also included in the storage media 108. However, it is noted that the general ledger 110 and the reporting engine 118 may be hosted by different server systems in some implementations.

In general, the reporting engine 118 is operative to enable users to request various financial reports from the server systems 102. FIG. 1 illustrates two example users at 120a and 120n (collectively, users 120). However, implementations of this description may accommodate any number of users 120 as served by any appropriate number of server systems 102.

In some scenarios, the users 120 may interact directly with the server system 102. In other examples shown in FIG. 1, the users 120 may communicate with the server system over one or more intermediate networks 122. These networks 122 generally represent any protocols, adapters, components, and other general infrastructure associated with wired and/or wireless communications networks. Such networks 122 may be global, regional, local, and/or personal in scope and nature, as appropriate in different implementations.

FIG. 1 denotes requests for the financial reports at 124a and 124n (collectively, requests 124), as submitted respectively by the users 120a and 120n. It is noted that the bidirectional arrows shown at 124a and 124n may also represent responses to such requests, as provided respectively to the users 120.

Having described the components of the server systems 102 within the operating environments 100, the discussion now turns to a description of client-side components. This description is now provided with FIG. 2.

Figure 2:
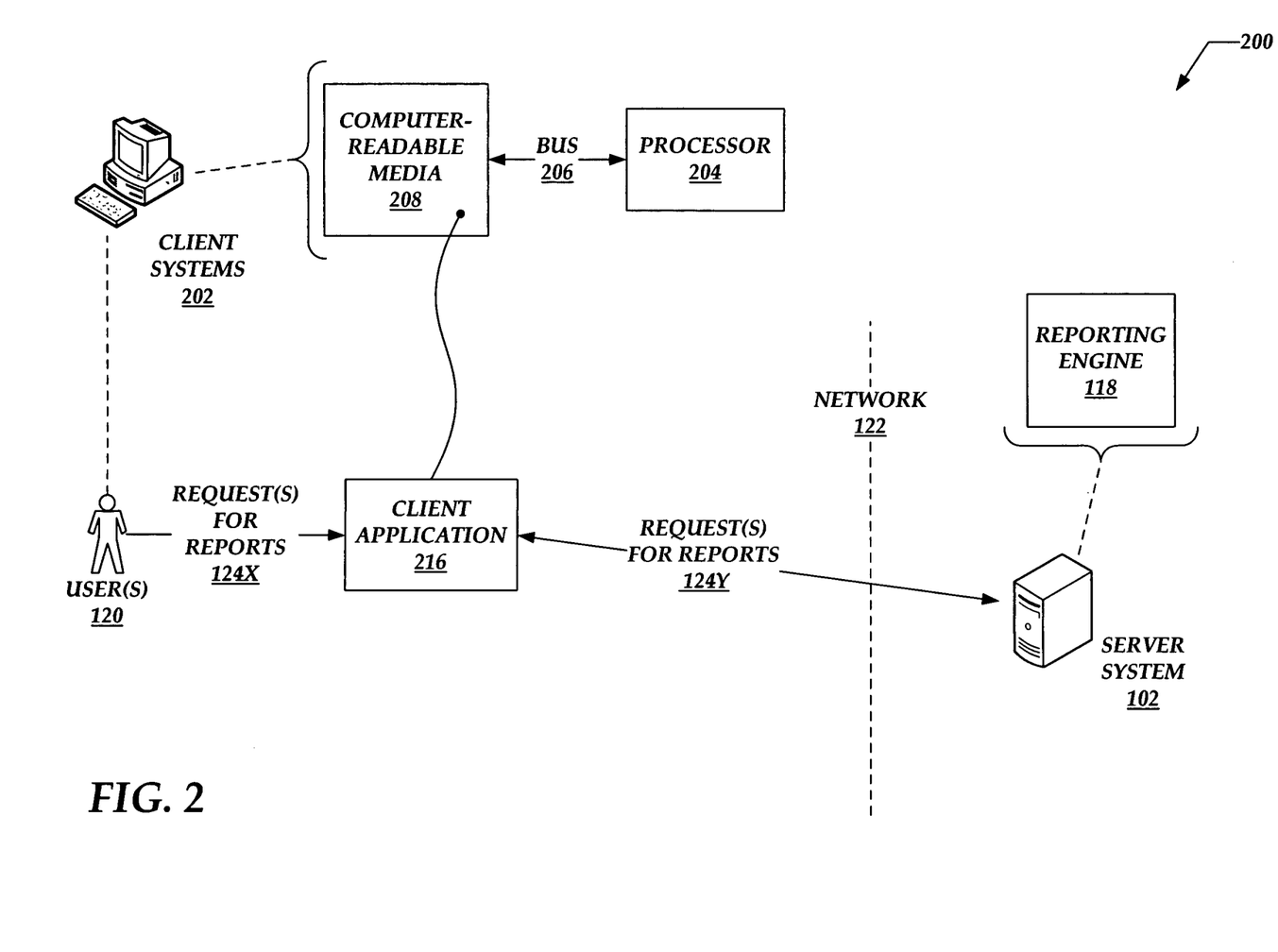
FIG. 2 is a combined block and flow diagram illustrating client-side components that may enable client-side systems to participate in tools and techniques for dimension-based financial reporting using multiple dimensions.

FIG. 2 illustrates client-side components, denoted generally at 200, that may enable client-side systems to participate in the tools and techniques for dimension-based financial reporting using multiple dimensions. For convenience of description, but not to limit possible implementations, FIG. 2 may carry forward some elements from previous drawings, and denote them with identical reference numbers. For example, FIG. 2 carries forward examples of server systems at 102, a reporting engine at 118, a network at 122, and users at 120.

Turning to FIG. 2 in more detail, the users 120 may interact with corresponding client systems 202, which may be workstations, desktop computing systems, or the like. The graphical elements used in FIG. 1 to depict the server systems 102, the client systems 202, and other components shown herein, are chosen only to facilitate illustration, but not to limit possible implementations of this description. More particularly, FIG. 1 illustrates the client system 202 as a desktop computing system, but the client system could also be a mobile, notebook, or laptop computing system.

Turning to the client systems 202 in more detail, these systems may include one or more processors 204, which may have a particular type or architecture, chosen as appropriate for particular implementations. However, the processors 204 may or may not have the same type and architecture as the processors 104 shown in FIG. 1. The processors 204 may couple to one or more bus systems 206 chosen for compatibility with the processors 204.

The client systems 202 may also include one or more instances of computer-readable storage media 208, which couple to the bus systems 206. The bus systems may enable the processors 204 to read code and/or data to/from the computer-readable storage media 208. The media 208 may represent storage elements implemented using any suitable technology, including but not limited to semiconductors, magnetic materials, optics, or the like. The media 208 may include memory components, whether classified as RAM, ROM, flash, or other types, and may also represent hard disk drives.

The storage media 208 may include one or more data structures and modules of instructions that, when loaded into the processor 206 and executed, cause the client systems 202 to perform various techniques for dimension-based financial reporting using multiple dimensions. Examples of these modules may include a client application 216. In example implementations described herein, the client application 216 may be a browser, a thin client, or other application suitable for interacting with the reporting engine 118 over the network 122. As shown in FIG. 2, examples of such interactions may include commands, denoted at 124x, from the users 120 entered through the client application 216 to request financial reports from the reporting engine 118. In turn, the client application 216 may forward these commands to the server system 102 for execution, as denoted at 124y.

Having described the client-side components in FIG. 2, the discussion now turns to a more detailed description of the storage elements 114. This description is now provided with FIG. 3.

Figure 3:
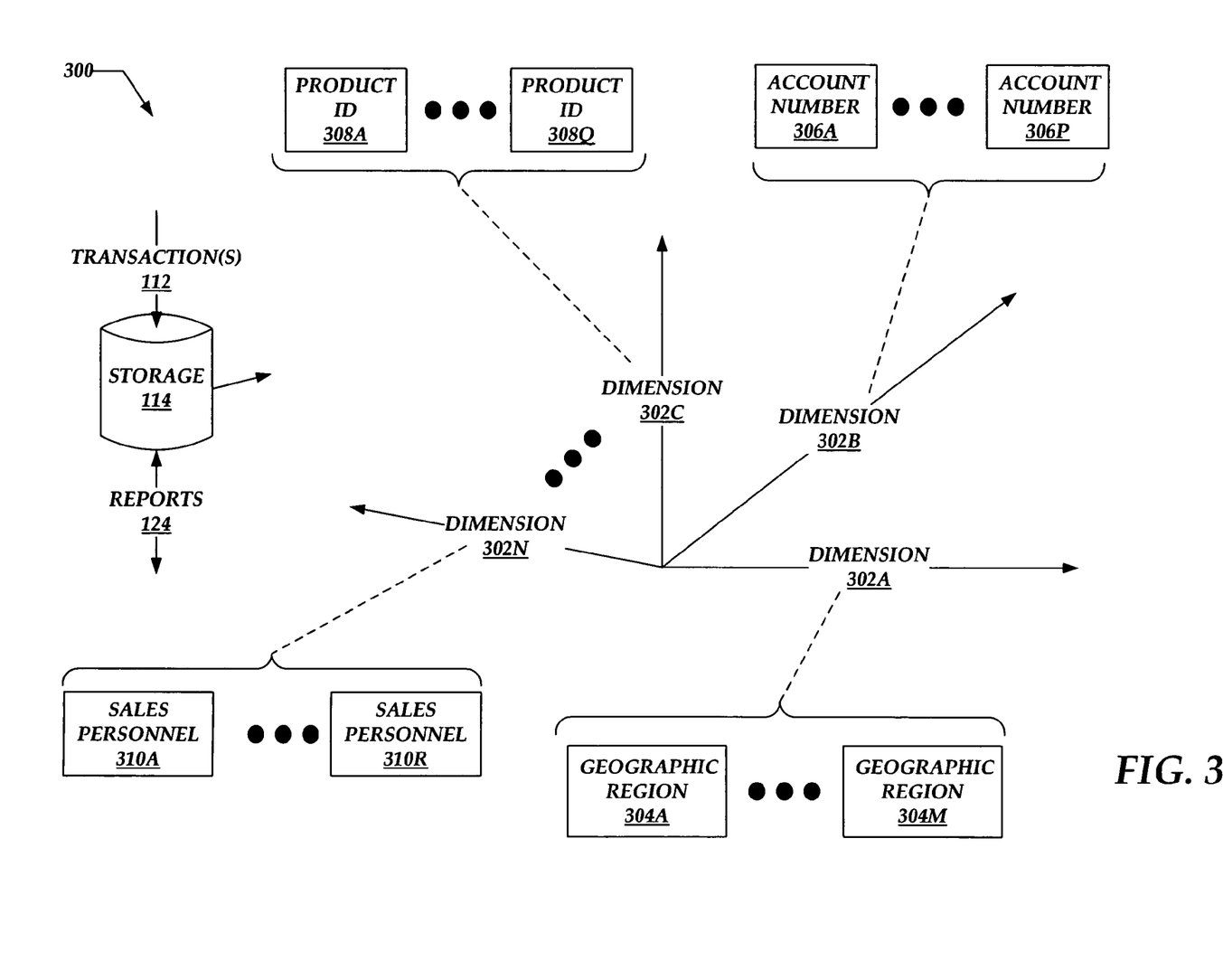
FIG. 3 is a block diagram illustrating data structures for implementing storage elements as shown in FIG. 1.

FIG. 3 illustrates data structures, denoted generally at 300, suitable for implementing the storage elements shown in FIG. 1. For convenience of description, but not to limit possible implementations, FIG. 3 may carry forward some elements from previous drawings, and denote them with identical reference numbers. For example, FIG. 3 carries forward examples of storage elements at 114, as well as transaction information 112 as loaded into the storage elements and reports 124 that may be generated from the storage elements.

Turning to the storage elements 114 in more detail, information pertaining to the transactions 112 may be organized according to various parameters. FIG. 3 graphically illustrates a plurality of dimensions suitable for organizing these parameters. More specifically, FIG. 3 illustrates dimensions 302a, 302b, 302c, and 302n (collectively, dimensions 302). As information related to various financial transactions 112 arrives, the storage elements 114 may organize this information along the various dimensions 302 for subsequent query and retrieval.

To facilitate this description, FIG. 3 provides various examples of dimensions. For example, to the extent that various transactions 112 are associated with particular geographic regions (e.g., countries, states, cities, counties, subdivisions of any of the foregoing, or the like), members 304a and 304m (collectively, members 304) arranged along the dimension 302a may associate particular transactions with corresponding relevant geographic regions. Similarly, to the extent that particular transactions 112 relate to individual accounts, members 306a and 306p (collectively, members 306) arranged along the dimension 302b may associate particular transactions with corresponding relevant account numbers. Likewise, assuming that particular transactions involve particular products, members 308a and 308q (collectively, members 308) may associate particular transactions with corresponding product identifiers. Finally, assuming that particular transactions may be associated with responsible sales personnel, members 310a and 310r (collectively, members 310) may associate particular transactions with corresponding responsible sales personnel.

FIG. 3 graphically illustrates the representations of the dimensions 302 as axes within a coordinate system only to facilitate this description, but not to limit implementations of this description. For example, the relationships shown in FIG. 3 may be implemented in any number of ways, in for example spreadsheet and/or database applications. In the models shown graphically in FIG. 3, points defined within the N-dimensional coordinate system may represent particular transactions, with the dimensions 302 relating these transactions to corresponding information (e.g., geographic region, account number, product identifier, sales personnel, or the like.

In providing the illustrations shown in FIG. 3, as well as the related description above, it is noted that implementations of the storage elements 114 may incorporate representations of any number of dimensions 302. FIG. 3 illustrates four dimensions only for the purposes of this description, but not to limit possible implementations. In addition, FIG. 3 illustrates two examples of members associated with the different dimensions only for clarity of illustration, but not limitation. More specifically, implementations of this description may associate any number of members 304, 306, 308, and 310 with particular dimensions 302.

It is also noted that the information stored along the dimensions 302 (e.g., geographic regions, account numbers, product identifiers, sales personnel, and the like) are provided only to facilitate this description, but not to limit possible implementations. For example, implementations of this description may represent other factors or parameters relating to the transactions 112 along the dimensions 302.

Having described the storage elements 114 in FIG. 3, the discussion now turns to a description of process flows related to dimension-based financial reporting using multiple dimensions. This description is now provided with FIG. 4.

Figure 4:
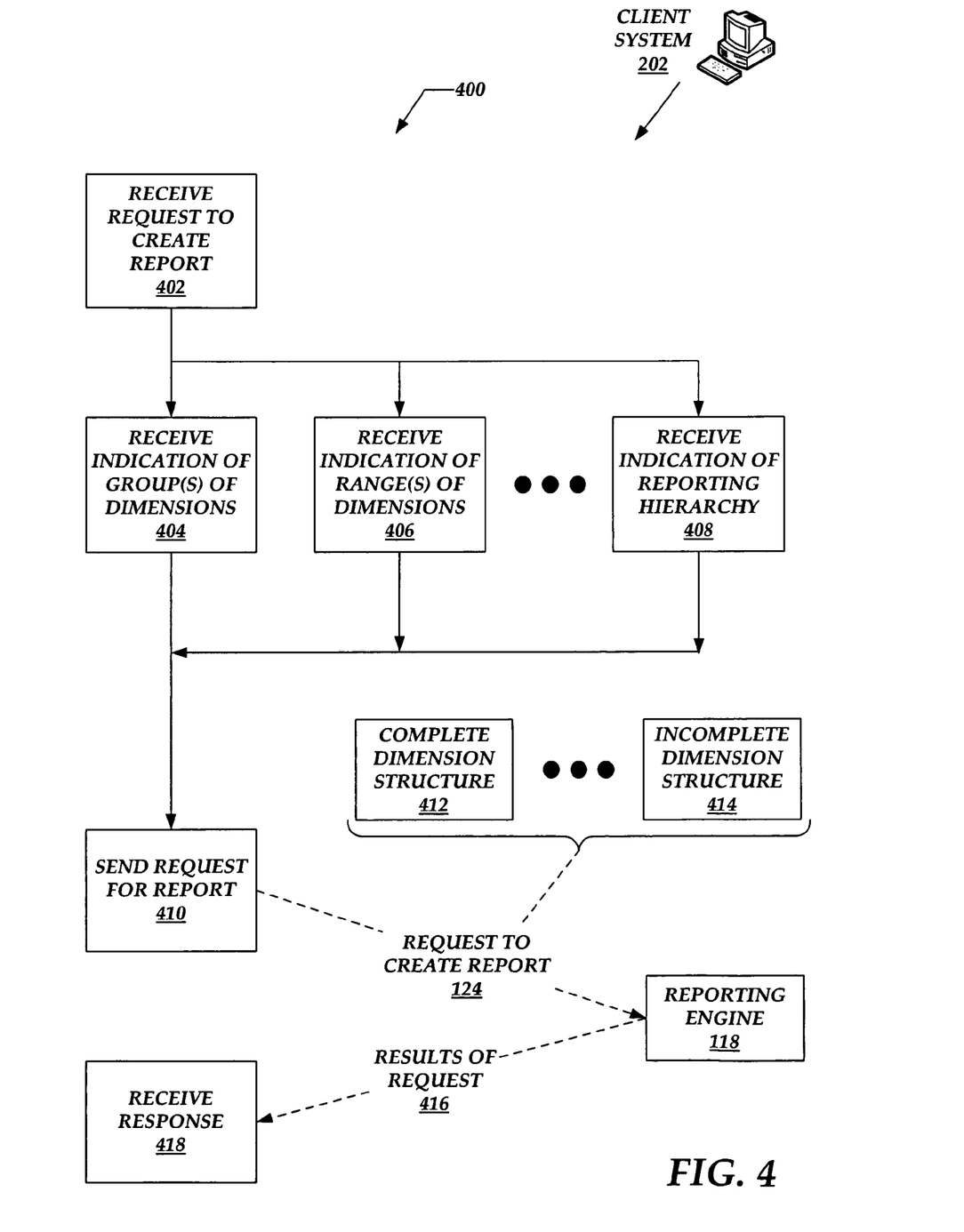
FIG. 4 is a flow chart illustrating client-side processes for dimension-based financial reporting using multiple dimensions.

FIG. 4 illustrates process flows, denoted generally at 400, for dimension-based financial reporting using multiple dimensions. For purposes of this description, but not to limit possible implementations, the process flows 400 are illustrated and described herein as being performed by the client system 202. However, implementations of this description may perform at least portions of the process flows 400 using other components without departing from the scope and spirit of this description. In addition, these process flows are described as proceeding in certain orders only for purposes of this description, and implementations of these process flows may proceed in different orders as well.

Turning to the process flows 400 in more detail, block 402 generally represents achieving a request to create a report. More specifically, block 402 may include receiving a request from a user (e.g., 120 in FIGS. 1 and 2) for financial reports to be created by a reporting engine (e.g., 118).

The process flows 400 may enable users to request reports that are customized as appropriate for different purposes or interests. For example, block 404 represents receiving an indication from the user of one or more selected dimensions (e.g., 302 in FIG. 3) of interest for a particular report. More specifically, block 404 may include designating these selected dimensions as a group for the purposes of requesting and creating the report. For example, block 404 may represent the user individually selecting one or more particular geographic regions of interest (e.g., states, cities, or the like) for a given report.

Block 406 represents receiving an indication from the user of one or more ranges of dimensions of interest for a particular report. For example, assuming that at least one of the dimensions includes members (e.g., product numbers or identifiers) that are ordered sequentially, block 406 may include enabling the user to select a range of such dimensions.

Figure 6:
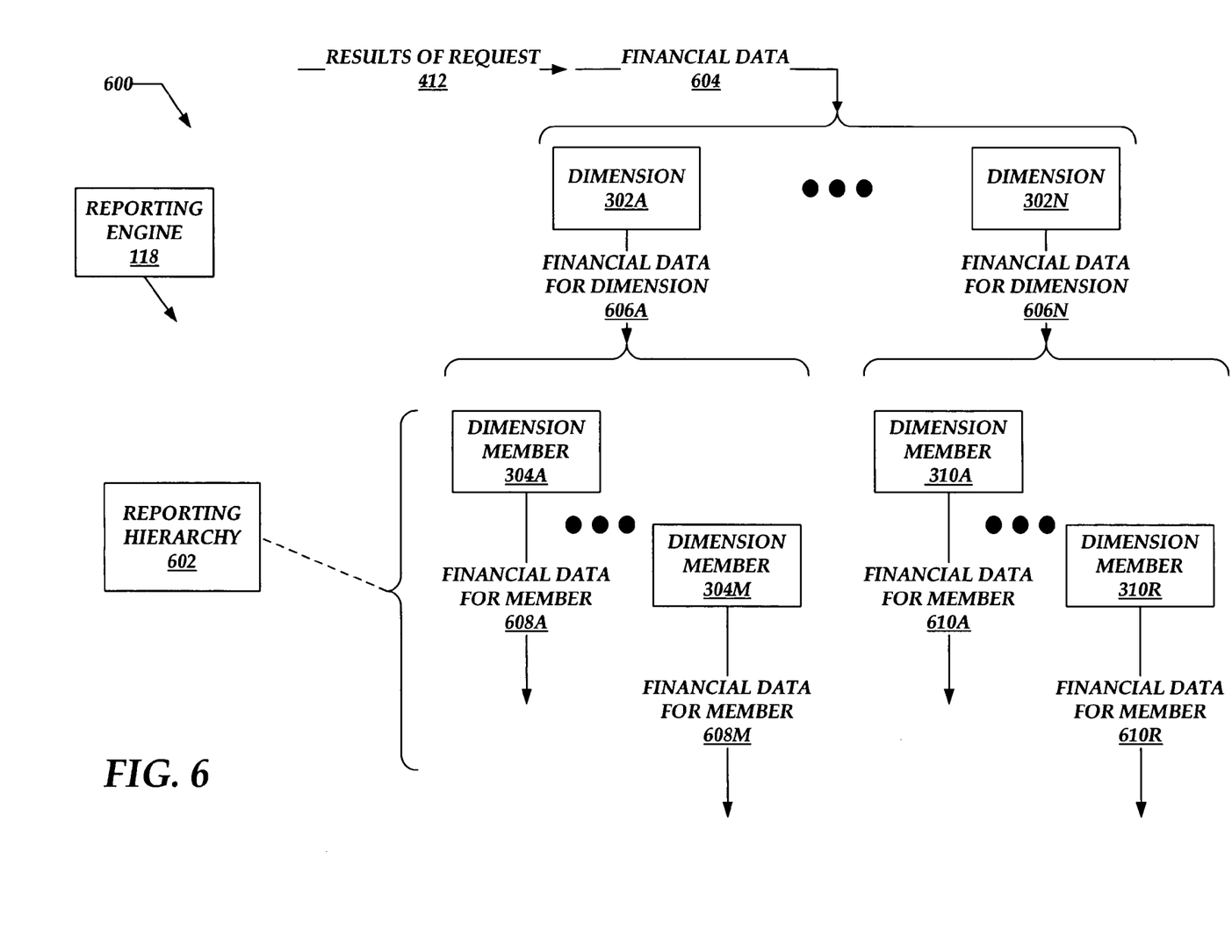
FIG. 6 is a combined block and flow diagram illustrating a customizable hierarchy for financial reports requested and obtained using the tools and techniques described herein.

Block 408 represents receiving an indication of a report hierarchy created by or on behalf of one or more particular users. The report hierarchy created in block 408 may, in some cases, incorporate user selections of particular dimensions as represented in blocks 404 and/or 406. FIG. 6 below provides additional illustration and detail relating to reporting hierarchies. However, in overview, reporting hierarchies as described herein enable users to specify how overall financial data, gathered across a plurality of different dimensions, is to be filtered or organized for presentation to particular users.

It is noted that different iterations of the process flows 400 may or may not perform all of the blocks 404, 406, and/or 408. For example, a given user may initially perform blocks 404, 406, and 408 to select groups or ranges of dimensions of interest for a given report, and to request creation of a customized report hierarchy for this given report. Having done so, the user may bypass at least one of blocks 404, 406, and 408 and subsequent iterations of the process flows 400, and proceed directly from block 402 to block 410.

Turning to block 410, this block represents sending a request from a client system (e.g., 202) to a server system (e.g., 102 and FIG. 1) to create the report requested by the user in block 402. FIG. 4 denotes this request to create the report at 124, as carried forward from FIG. 1.

As shown in FIG. 4, the requests 124 may, in some instances, reference dimensions or account structures that are completely populated, or fully qualified. FIG. 4 denotes generally at 412 requests that reference such fully-qualified dimensions. In other instances, the requests 124 may reference dimensions or account structures that are not completely populated, or are not fully qualified. FIG. 4 denotes examples of incomplete dimension structures at 414.

FIG. 4 carries forward at 118 an example of a reporting engine, which may receive the request 124 and process it using the tools and techniques described herein. In response to the request 124, the reporting engine 118 may return results 416 to the client system. In turn, the client system may receive these results, as represented generally at block 418.

Having described examples of client-side process flows related to dimension-based financial reporting using multiple dimensions storage elements in FIG. 4, the discussion now turns to a description of additional process flows related to dimension-based financial reporting using multiple dimensions. This description is now provided with FIG. 5.

Figure 5:
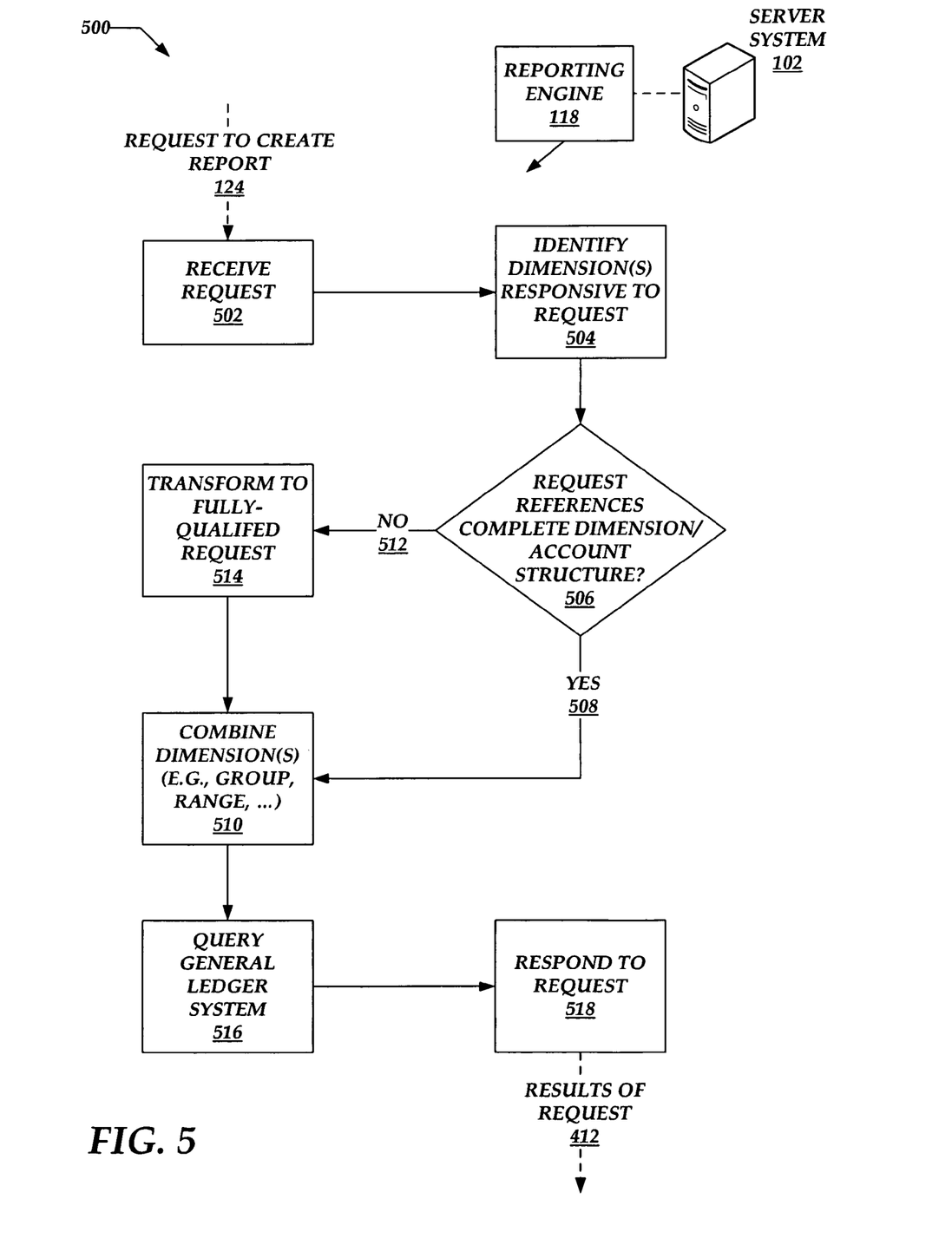
FIG. 5 is a flow chart illustrating server-side processes for dimension-based financial reporting using multiple dimensions.

FIG. 5 illustrates process flows, denoted generally at 500, for dimension-based financial reporting using multiple dimensions. For purposes of this description, but not to limit possible implementations, the process flows 500 are illustrated and described herein as being performed by a reporting engine (e.g., 118) running on a server system (e.g., 102). However, implementations of this description may perform at least portions of the process flows 500 using other components without departing from the scope and spirit of this description. In addition, these process flows are described as proceeding in certain orders only for purposes of this description, and implementations of these process flows may proceed in different orders as well.

Turning to the process flows 500 in more detail, block 502 represents receiving a request (e.g., 124) to create a report from a dimension-based financial reporting system. For example, block 502 may include receiving a request from a client system (e.g., 202).

Block 504 represents identifying one or more dimensions that are responsive to the request received in block 502. For example, block 504 may include querying storage elements (e.g., 114, shown in FIG. 1 and illustrated in more detail in FIG. 3). In an illustrative scenario, the incoming request 124 may specify a report listing particular products sold within a given geographic region by particular sales personnel. Referring briefly back to FIG. 3, the dimension 302c organizes product identifiers (e.g., members 308), the dimension 302a organizes geographic regions (e.g., members 304), and the dimension 302n organizes sales personnel (e.g., members 310). In this example scenario, block 504 may include querying the storage elements 114 along the dimensions 302 as appropriate to extract or retrieve member information that is responsive the input request 124.

In turn, block 506 includes determining whether the incoming request (e.g., 124) references a complete (i.e., fully-qualified) dimension or account structure. For example, block 506 may include analyzing those dimensions or account structures within the storage elements that are responsive to the incoming request, and determining whether those referenced dimensions or account structures are fully populated. If the referenced dimensions or account structures are complete (i.e., fully populated or qualified), then the process flows 500 may take Yes branch 508 to block 510, which represents combining these dimensions as appropriate to create or generate the requested report.

Returning to decision block 506, if at least one of the referenced dimensions or account structures is incomplete (i.e., not fully populated or not fully qualified), then the process flows 500 may take No branch 512 to block 514, which represents transforming the input request into a fully-qualified request. Put differently, block 514 may include identifying any incomplete dimensions or account structures referenced by the input request, and may further include processing these dimensions as appropriate to enable processing of the input request. Returning to the above example scenario involving a given report listing particular products sold within a given geographic region by particular sales personnel, an example of incomplete dimensions may include scenarios in which the storage elements 114 do not contain a complete listing of sales achieved by all sales personnel. In such cases, block 514 may include inserting wildcards into the storage elements 114 to define full listings of the sales information.

After performing block 514 to transform the input request into a fully-qualified request, the process flows may proceed to block 510. As described above, block 510 represents combining information stored along dimensions as appropriate to satisfy the input request. Referring briefly back to the graphical representations of the dimensions 302 in FIG. 3, and recalling the example scenario involving the report listing particular products sold within a given geographic region by particular sales personnel, block 510 may include identifying those dimensions that are responsive to the specifications, and identifying members of those dimensions that meet the specifications. In addition, block 510 may include identifying any intersections between members of these different dimensions. For example, assume that salesman John Smith is operating within Marietta, Ga., and that salesman Stephen Jones is operating within Roswell, Ga. Assume further that both salesmen are selling a given product within their respective regions of responsibility.

In this example scenario, the dimension 302n within the storage elements 114 may include respective members 310a and 310r for storing and tracking sales history related to John Smith and Stephen Jones. In addition, the dimension 302c may include members 308a and 308q indicating which products John Smith and Stephen Jones are selling and/or have sold. Finally, the dimension 302a may include members 304a and 304m that indicate the geographic regions of responsibility assigned to John Smith and Stephen Jones (i.e., Marietta and Roswell, respectively). in this example, assuming that the requested report specifies certain products sold by John Smith and Stephen Jones in Marietta and Roswell, block 510 may include referencing the storage elements 114 (however implemented) to locate any intersections between the member entries for John Smith and Stephen Jones along the dimension 302n, the member entries for Marietta and Roswell along the dimension 302a, and the member entries along the dimension 302c.

Block 516 represents querying a general ledger system (e.g., 110 in FIG. 1) to determine whether any previous financial transactions (e.g., 112a and 112m in FIG. 1) fall within the intersections identified in block 510. In turn, the process flows 500 may proceed to block 518, which represents responding to the input request 124 with the results obtained from block 516. FIG. 5 carries forward example results at 412. If the general ledger system contains any financial transactions that fall within the intersections defined in block 510, the results 412 may include a report incorporating representations of any such financial transactions. Otherwise, if the general ledger system does not contain any financial transactions that fall within these intersections, the results 412 may so indicate.

Having described at the server-side process flows 500 and FIG. 5, the discussion now turns to a more detailed description of the reporting hierarchy described above in FIG. 4. This more detailed description is now provided with FIG. 6.

FIG. 6 illustrates data elements and flows, denoted generally at 600, related to a customizable hierarchy for financial reports requested and obtained using the tools and techniques described herein. For convenience of description, but not to limit possible implementations, FIG. 6 may carry forward some elements from previous drawings, and denote them with identical reference numbers. For example, FIG. 6 carries forward an example of a reporting engine 118. However, implementations of this description may perform at least portions of the data elements and flows 600 using other components without departing from the scope and spirit of this description.

FIG. 6 denotes at 602 a representation of a customized reporting hierarchy, which may be received as shown at block 408 in FIG. 6. For example, particular users (e.g., 120 in FIG. 1) may customize one or more reporting hierarchies for their own uses, or for usage by others. The reporting hierarchy 602 may specify any number of dimensions by which financial reports are to be organized. In a generalized, but non-limiting, example, the reporting hierarchy 602 may specify dimensions 302a and 302n (carried forward from FIG. 3) by which a given report is to be organized. In addition, the reporting hierarchy 602 may specify one or more members within particular dimensions, in which to further organize the given report. in a generalized example, FIG. 6 illustrates members 304a and 304m within the dimension 302a, and members 310a and 310r within the dimension 302n.

Recalling description from FIG. 5, the process flows 500 may be executed to create results for a given input request for a report, carried forward into FIG. 6 at 412. These results may include, at least in part, overall financial data 604 that is responsive to the requested report. In turn, this overall financial data 604 may be input to the reporting hierarchy 602, to be organized by the various dimensions specified in this hierarchy. In the example shown in FIG. 6, a first subset 606a of the overall financial data 604 may be associated with a dimension (e.g., 302a) specified in the reporting hierarchy, while at least a further subset 606n may be associated with another dimension (e.g., 302n) within the reporting hierarchy. While FIG. 6 illustrates two examples of these subsets 606a and 606n (collectively, subsets 606), implementations of this description may incorporate any number of subsets.

Turning to the subset 606a of the financial data in more detail, this subset may be further categorized or organized by particular dimension members 304a and 304m, resulting in further subsets 608a and 608m (collectively, further subsets 608). Turning to the other subset 606n of the financial data, this subset may be further categorized or organized by particular dimension members 310a and 310r, resulting in further subsets 610a and 610r (collectively, further subsets 610).

It is appreciated that the example reporting hierarchy 602 may operate in any number of ways to process particular requests for financial reports, with the examples in this description being provided only to facilitate discussion, but not to limit possible implementations. for example, returning to the scenario described above, involving a requested report indicating how many products are sold within particular geographic areas by particular sales personnel, the overall financial data 604 may represent overall sales of the particular products, while the subsets 606a and 606n may correspond to sales of those products occurring within particular geographic regions (e.g., Marietta and Roswell). Finally, the further subsets 608 and 610 may correspond to sales occurring within those geographic regions associated with particular sales personnel (e.g., John Smith and Stephen Jones).

Having described the data elements and flows 600 related to a customizable hierarchy for financial reports in FIG. 6, the discussion now turns to a description of example architecture of the reporting engine 118. This description is now provided with FIG. 7.

Figure 7:
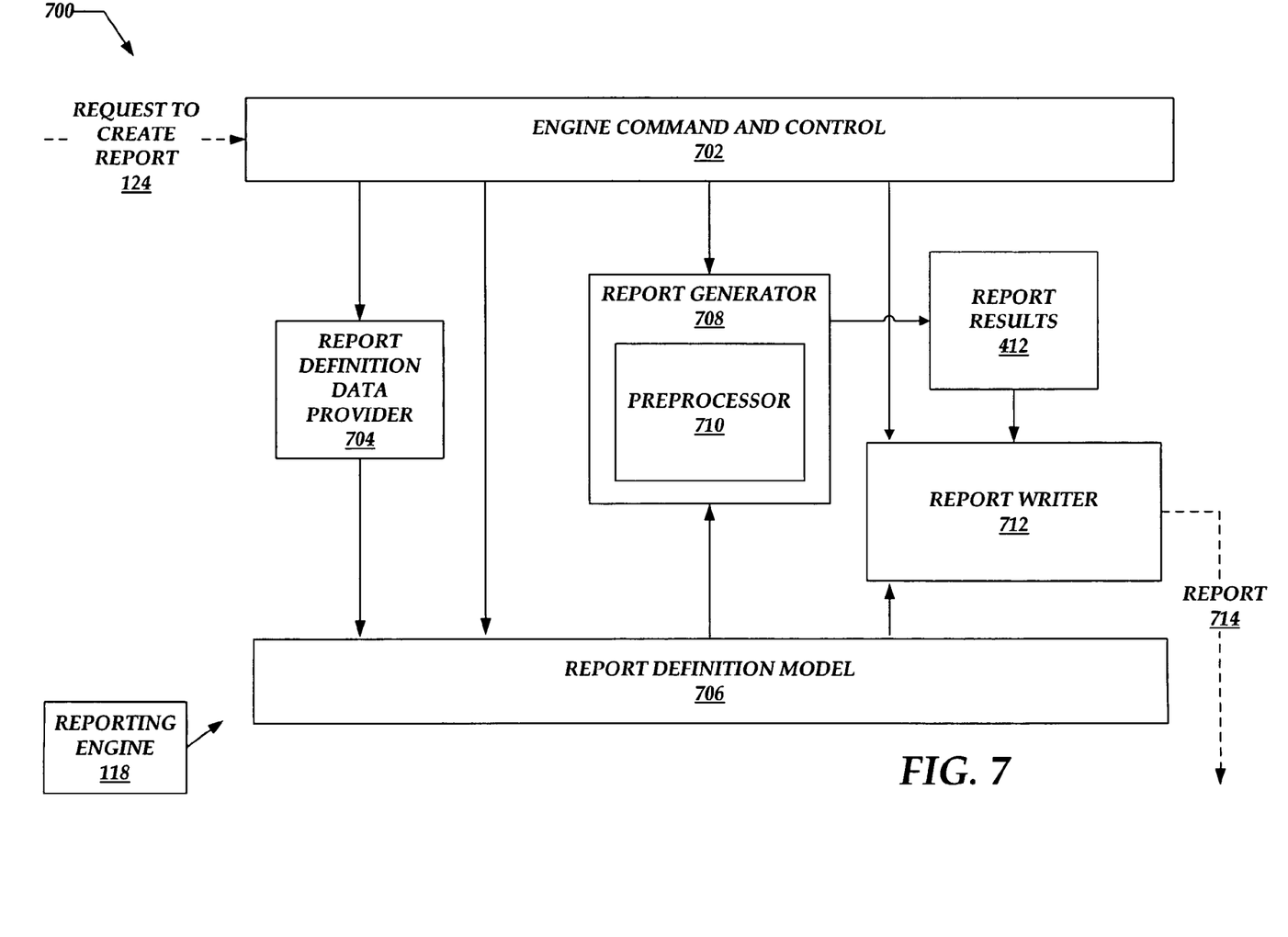
FIG. 7 is a block diagram illustrating example architectures for reporting engines suitable for dimension-based financial reporting using multiple dimensions.

FIG. 7 illustrates example architectures, denoted generally at 700, for reporting engines suitable for dimension-based financial reporting using multiple dimensions. For purposes of this description, but not to limit possible implementations, the architectures 700 are illustrated and described in connection with a reporting engine (e.g., 118). However, implementations of this description may incorporate the architectures 700 and two other components without departing from the scope and spirit of this description.

Turning to FIG. 7 in more detail, an engine command and control module 702 may be operative to coordinate and control processing by the other modules shown in FIG. 7, in accordance with applicable business rules. These business rules may specify formatting for generated reports, may specify calculations to be applied when compiling these results and reports, may specify particular or specific calculations to be performed on values contained within the dimensions, or the like. In other examples, these business rules may calculate cash flow statements, profit and loss statements, and the like, whether actual or projected.

These rules may also incorporate ownership shares when performing these and other calculations. For example, any number of different entities may own respective shares of a given enterprise, and these rules may allocate calculated profits and losses to these owners according to their respective shares. In addition, these rules may consolidate reporting of financial performance across a variety of different companies, divisions, or business units associated within a given enterprise, or otherwise related to one another.

In some implementations, the calculations may be performed in a two-step process. For example, in a first pass, the calculation process may access the relevant financial records (e.g., as contained in storage elements 114 in FIG. 1), and obtain the actual values stored in those elements. in a second pass, the calculation process may incorporate a beginning balance, and update the values obtained in the first pass in response to this beginning balance.

In example scenarios, the command and control module 702 may receive and respond to respond to a request to create a financial report (e.g., 124, as carried forward from FIG. 1). In turn, the command and control module may invoke a report definition data provider 704 to output a report definition model 706 applicable to the input request 124. Examples of the report definition model 706 may include the reporting hierarchies 602 shown in FIG. 6. As described above, the report definition model or reporting hierarchies may reference any number or combinations of dimensions in which reported financial transactions are organized within storage elements (e.g., 114 in FIG. 1).

A report generator module 708 may include a preprocessor 710 that receives the report definition model 706, and identifies the dimensions (or combinations of dimensions) relevant to the input request and the corresponding report definition model. These dimensions may be organized by rows and columns, while the report definition model may specify tree structures, such as those shown in FIG. 6, for filtering or organizing financial data.

In addition, these dimensions may incorporate either complete or incomplete account structures, in different possible runtime scenarios described elsewhere herein. For example, if ten dimensions are supported by a given implementation, not all ten dimensions may be fully populated in some cases. However, so long as at least one of the dimensions is populated, then the tools and techniques described herein may generate a report from that one populated dimension.

In cases where the dimensions incorporate incomplete account structures, the preprocessor 710 may transform these incomplete account structures into fully-qualified requests. In example scenarios, the preprocessor 710 may fill-in missing account sections with wildcards to provide a fill account structure. This transformation process is referred to herein as a "balance" request, in which data gaps in such incomplete account structures are filled using appropriate wildcarding algorithms, resulting in a balance request that can be passed to the report generator 708. In turn, the report generator may submit these fully-qualified requests to a general ledger component (e.g., 110 in FIG. 1). Afterwards, the report generator 708 may receive report results (e.g., 412 carried forward from FIG. 4) from the general ledger, and may forward these results to a report writer component 712. The report writer components 712 may format the report results 412 as appropriate for rendering and presentation to one or more users (e.g., 120 in FIG. 1), as represented generally at 714.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

In addition, certain process and data flows are represented herein as unidirectional only for the purposes of facilitating this description. However, these unidirectional representations do not exclude or disclaim implementations that incorporate bidirectional flows.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. At least one computer-readable storage medium having computer-executable instructions stored thereon which, when executed by a computer, cause the computer to perform a method comprising:
   receiving a request from at least one user to create a report to be populated from a dimension-based financial reporting system, the request specifying a range of members within dimensions of interest for the report, a group of dimensions of interest for the report, and a customized hierarchy specifying how data gathered across a plurality of dimensions is to be filtered or organized in the report, the request referencing at least one or more dimensions that are not fully qualified and one or more dimensions that are fully qualified;
   sending a further request, on behalf of the user, to the financial reporting system to create the report; and
   receiving from the financial reporting system a response to the further request, wherein the response is a report generated by the financial reporting system according to the request by transforming the one or more dimensions that are not fully qualified into fully qualified dimensions.

2. A computer-implemented method comprising performing computer-implemented operations for:
   receiving a request from at least one user at a client computer system to create a report to be populated from a dimension-based financial reporting system;
   receiving a representation of at least one customized hierarchy for creating the report at the client computer system, the customized hierarchy specifying how data gathered across a plurality of dimensions is to be filtered or organized in the report and referencing at least one or more dimensions that are not fully qualified and one or more dimensions that are fully qualified;
   sending a further request from the client computer system, on behalf of the user, to the financial reporting system to create the report based upon the customized hierarchy; and
   receiving a response to the further request from the financial reporting system at the client computer system, wherein the response is a report generated according to the customized hierarchy by transforming the one or more dimensions that are not fully qualified into fully qualified dimensions.

3. The computer-implemented method of claim 2, wherein the representation of at least one customized hierarchy for creating the report specifies a plurality of dimensions to be incorporated within the report.

4. The storage medium of claim 2, wherein the request received from the user to create a report further specifies least one group of dimensions to be incorporated within the report.

5. The storage medium of claim 2, wherein the request received from the user to create a report further specifies least one range of members within dimensions to be incorporated within the report.

6. An apparatus comprising:
   one or more processors; and
   at least one computer-readable storage media having instructions stored thereupon which, when executed on the one or more processors, cause the processors to
      receive a request from at least one user of the apparatus to create a report to be populated from a dimension-based financial reporting system, the request comprising a group of selected dimensions to be included in the report, a range of selected members within dimensions to be included in the report, and a reporting hierarchy specifying how data gathered across the selected dimensions is to be organized, at least one of the selected dimensions being not fully qualified,
      in response to receiving the request, sending a further request from the apparatus, on behalf of the at least one user, to the financial reporting system to create the report based upon the customized hierarchy, and
      receive a response to the further request from the financial reporting system at the apparatus, wherein the response is a report generated by the financial reporting system according to the customized hierarchy by transforming the request into a fully qualified request, identifying one or more dimensions responsive to the fully qualified request, identifying one or more members of the identified dimensions that satisfy the fully qualified request, identifying the intersections between the identified members of the identified dimensions, and querying a general ledger system with the identified intersections.

* * * * *